June 2, 1931.  T. W. DETAMORE  1,808,639
WHEEL SCRAPER
Filed July 24, 1930   3 Sheets-Sheet 1
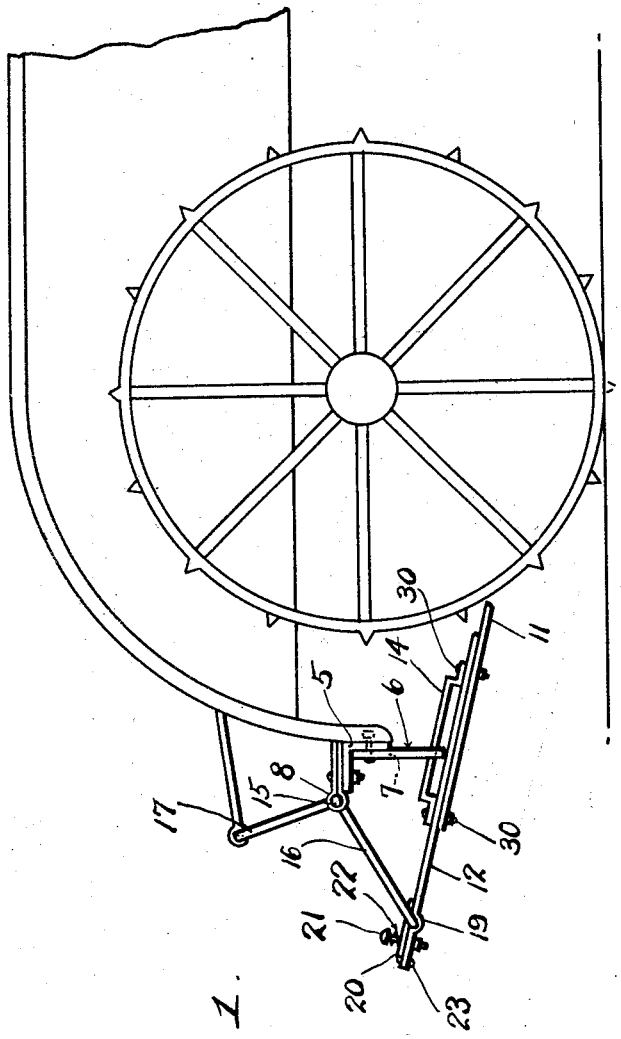
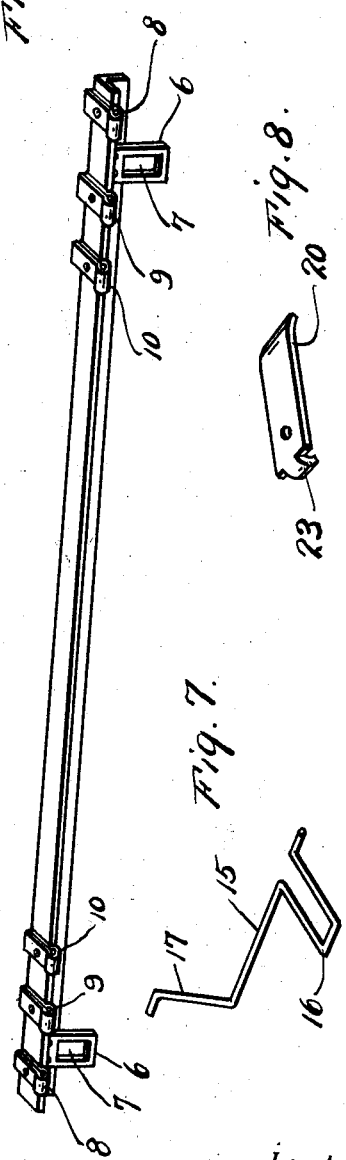
Inventor
T. W. Detamore
By Clarence A. O'Brien
Attorney

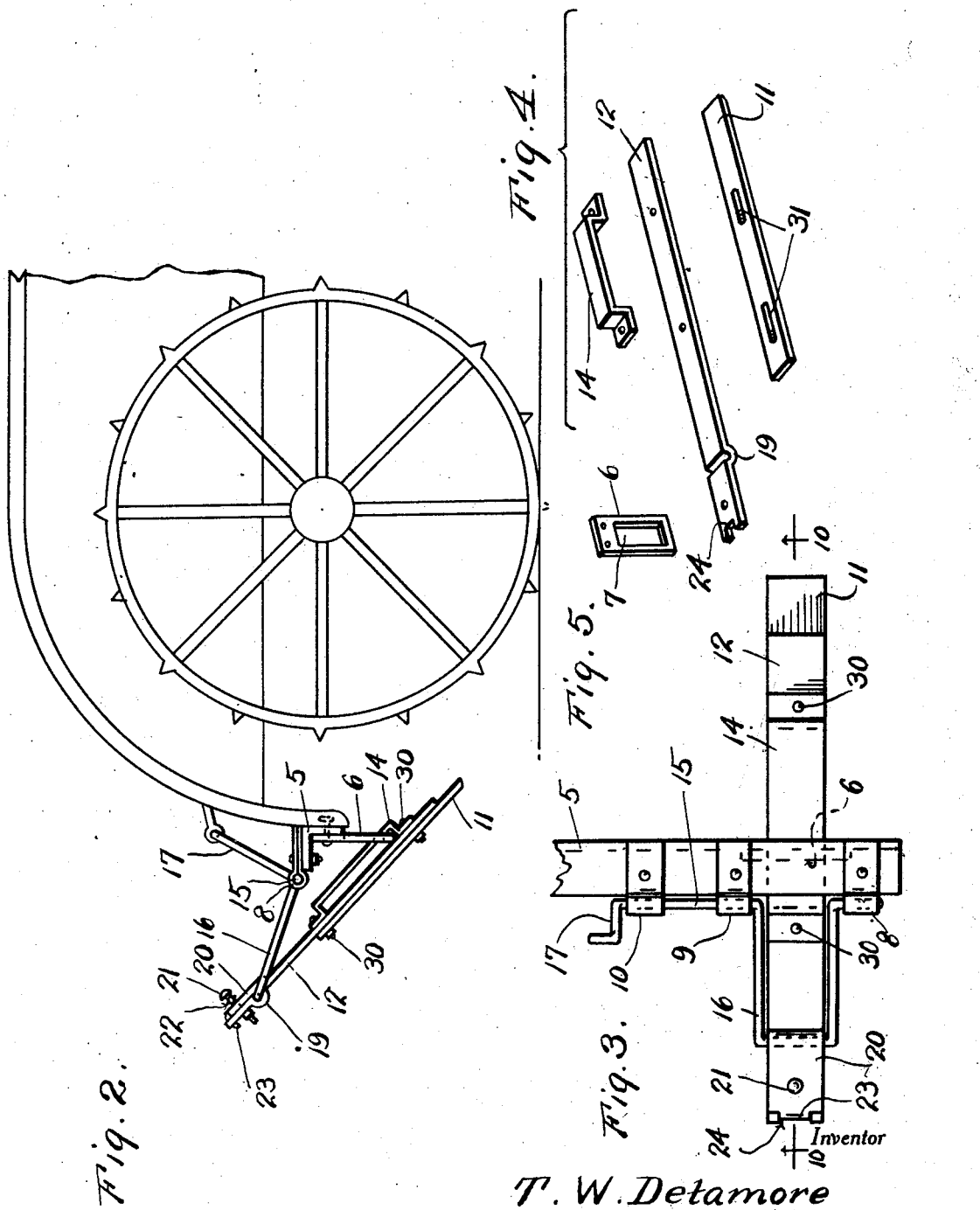

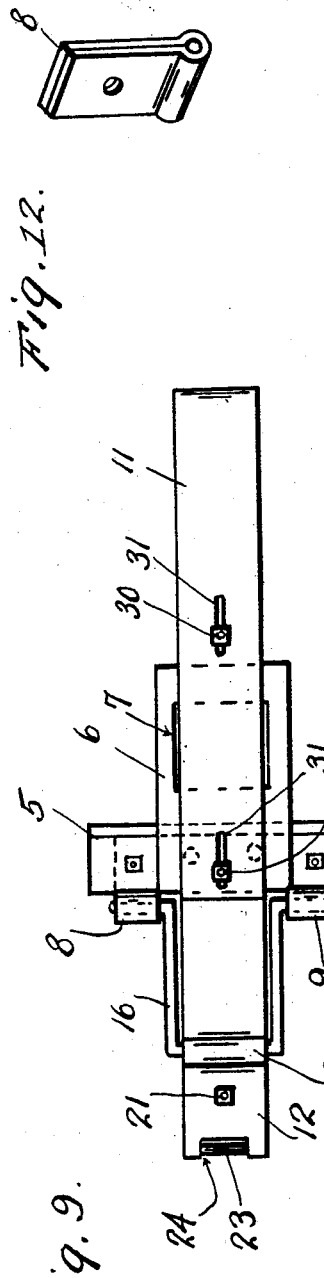

Patented June 2, 1931

1,808,639

UNITED STATES PATENT OFFICE

THEODORE W. DETAMORE, OF OSCEOLA, NEBRASKA

WHEEL SCRAPER

Application filed July 24, 1930. Serial No. 470,446.

The present invention relates to a wheel scraper particularly designed for use with a tractor and the prime object of the invention resides in the provision of an apparatus of this nature which is exceedingly simple in its construction, inexpensive to manufacture and install, easy to manipulate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangements of parts as will be hereinafter more fully described and claimed.

In the drawings:

Figure 1 is a side elevation of part of a tractor showing the invention in use with the parts in operative position.

Figure 2 is a similar view showing the device in a disengaged position,

Figure 3 is a top plan view of the device,

Figure 4 is a perspective view of the scraper blade and the parts which are to be attached thereto, Figure 5 is a perspective view of a bracket, Figure 6 is a perspective view of a cross bar with the bracket and hinge parts attached thereto, Figure 7 is a perspective view of the crank shaft, Figure 8 is a perspective view of the retaining plate.

Figure 9 is a bottom plan view of the apparatus,

Figure 10 is a longitudinal sectional view taken substantially on the line 10—10 of Figure 3, with the cross bar omitted, Figure 11 is a rear elevation of the apparatus, and Figure 12 is a perspective view of one of the strap bearings.

Referring to the drawings in detail it will be seen that the numeral 5 denotes an angle bar adapted to be mounted across a tractor or the like preferably connected to the rear ends of the fenders for the rear wheels thereof. Depending from the bar 5 are plate brackets 6 with enlarged openings 7 formed therein. On the top side of the bar 5 there are two groups of three bearings denoted by numerals 8, 9 and 10.

There are two scraping apparatuses but I shall only describe one in detail as this will suffice for a proper understanding of both. Each scraper comprises an elongated blade 11 bolted to an elongated plate 12 so as to project beyond one end thereof. An inverted U-shaped member 14 is bolted to the plate 12 and extends through the opening 7. A crank shaft 15 is journalled in the bearings 8, 9 and 10 with crank portions 16 between the bearings 8 and 9 and crank arm 17 adjacent the bearing 10 so that a suitable lever and link structure may be attached thereto for operation thereof.

The rear portion of the plate 12 is provided with a groove 19 for receiving the crank 16 and the crank is held in place by a plate 20, bolt 21 and spring 22. A curved lip 23 on the end of the retaining plate 20 is receivable in a notch 24 at the end of the plate 12. When the parts are in a position as shown in Figure 1 the blade 11 is positioned to scrape against the wheel. Should the blade come into contact with something which it cannot readily resist, it will be seen that the spring retained plate 20 allows the plate 12 to be freed from the crank 16 without breaking any of the parts of the apparatus.

By swinging the crank arm 17 by a link and lever structure (not shown) the apparatus may be rocked to disengaged position as shown in Figure 2.

It is thought that the construction, operation, utility and advantages of this invention will now be quite apparent to those skilled in this art without a more detailed description thereof.

It is to be noted that the bolt 30 used for securing together the brackets 14, the plate 12, and the blade 11 extend into slots 31 in the blade the same may be adjusted for wear and for different size tractors or the like upon which the apparatus is being used.

The present embodiment of the invention has been disclosed in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an apparatus of the class described, a blade, an elongated plate, an inverted U-shaped bracket, means for securing the bracket, the plate and the blade together, a supporting plate having an elongated opening through which the bracket extends, and means for moving the plate attached to the blade for positioning the blade in wheel engaging position and to disengaged position.

2. In an apparatus of the class described, a blade, an elongated plate, an inverted U-shaped bracket, means for securing the bracket, the plate and the blade together, a supporting plate having an elongated opening through which the bracket extends, and means for moving the plate attached to the blade for positioning the blade in wheel engaging position and to disengaged position, said means comprising a crank shaft having a crank portion receivable in a groove in the plate, a spring pressed plate over the groove to hold the crank in place.

3. In an apparatus of the class described, a blade, an elongated plate, an inverted U-shaped bracket, means for securing the bracket, the plate and the blade together, a supporting plate having an elongated opening through which the bracket extends, and means for moving the plate attached to the blade for positioning the blade in wheel engaging position and to disengaged position, said means comprising a crank shaft having a crank portion receivable in a groove in the plate, a spring pressed plate over the groove to hold the crank in place, a supporting bar having strap bearings in which the crank shaft is journalled.

4. In an apparatus of the class described, a blade, an elongated plate, an inverted U-shaped bracket, means for securing the bracket, the plate and the blade together, a supporting plate having an elongated opening through which the bracket extends, and means for moving the plate attached to the blade for positioning the blade in wheel engaging position and to disengaged position, said means comprising a crank shaft having a crank portion receivable in a groove in the plate, a spring pressed plate over the groove to hold the crank in place, a supporting bar having strap bearings in which the crank shaft is journalled, said supporting plate being attached to said bar.

In testimony whereof I affix my signature.

THEODORE W. DETAMORE.